(No Model.) 2 Sheets—Sheet 1.
P. W. TILLINGHAST & F. MALLALIEU.
PNEUMATIC TIRE.
No. 521,740. Patented June 19, 1894.
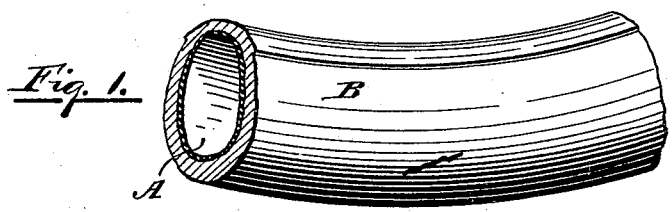
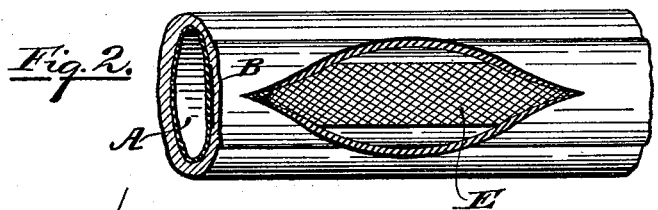
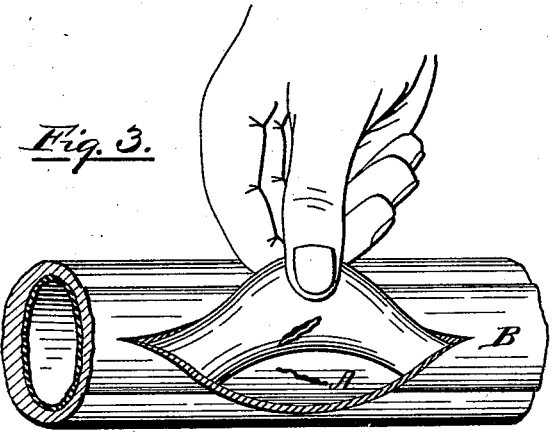
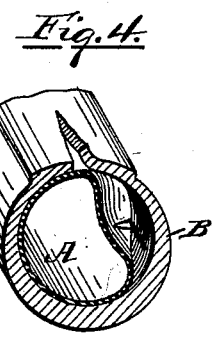
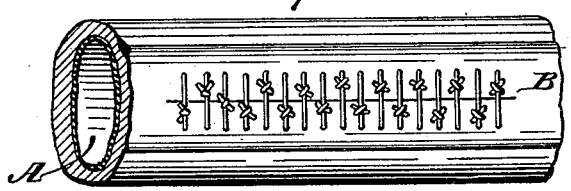
Witnesses. 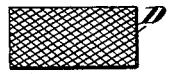 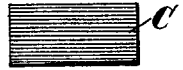 Inventors.
Charles Hannigan. Fig. 7. Fig. 6. Pardon W. Tillinghast.
G. W. Rea. Frank Mallalieu.
by O. Lapham
Atty.
THE NATIONAL LITHOGRAPHING COMPANY,
WASHINGTON, D. C.

(No Model.) 2 Sheets—Sheet 2.
P. W. TILLINGHAST & F. MALLALIEU.
PNEUMATIC TIRE.
No. 521,740. Patented June 19, 1894.
Fig. 8.
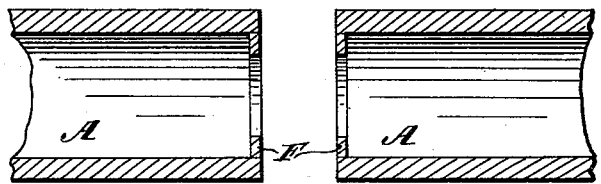
Fig. 9.
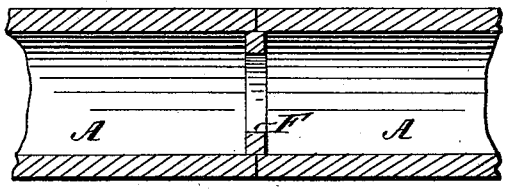 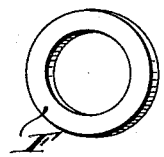
Fig. 10.
Fig. 11.
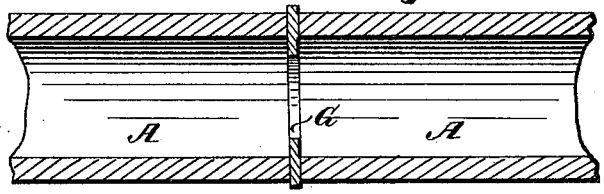 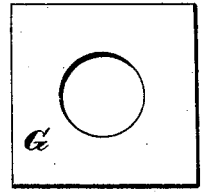
Fig. 12.
Fig. 13.
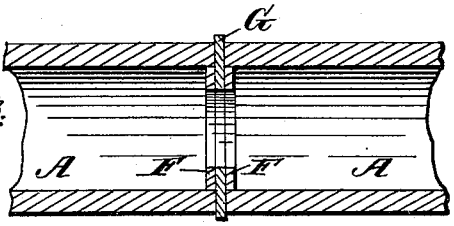
Fig. 14.
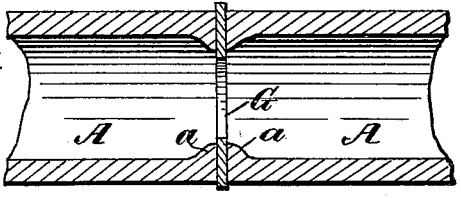
Witnesses
Charles F. Hannigan.
G. W. Rea.
Inventors
Pardon W. Tillinghast.
Frank Mallalieu.
by O. Lapham
Atty
THE NATIONAL LITHOGRAPHING COMPANY,
WASHINGTON, D. C.

UNITED STATES PATENT OFFICE.

PARDON W. TILLINGHAST AND FRANK MALLALIEU, OF PROVIDENCE, RHODE ISLAND.

PNEUMATIC TIRE.

SPECIFICATION forming part of Letters Patent No. 521,740, dated June 19, 1894.

Application filed March 3, 1894. Serial No. 502,159. (No model.)

*To all whom it may concern:*

Be it known that we, PARDON W. TILLINGHAST and FRANK MALLALIEU, citizens of the United States, both residing at Providence, in the county of Providence and State of Rhode Island, have invented new and useful Improvements in Pneumatic Tires and Process of Manufacture of the Same, of which the following is a specification.

Heretofore, in the manufacture of pneumatic tires, it has been a common practice to form an air tube of rubber and to inclose this tube in a covering of rubber combined with one or more layers of fabric, the air tube and covering being separately vulcanized before being brought together. This method of making pneumatic tires is objectionable for the reason that the entire adjoining surfaces of the two tubes are subject to injurious friction upon each other, owing to the flexing of the tire in use, resulting in great wear to the tire. This has been sought to be remedied by forming the two tubes with the rubber in a raw or unvulcanized state, the fabric employed in the construction of the outer tube being thus brought into contact with raw rubber, and the entire tire then subjected to vulcanization. This so thoroughly unites the layers of rubber and fabric composing the tire that they are practically inseparable, rendering it impossible to separate the outer tube from the air tube to repair the tire.

The object of the present invention is to provide a tire in which the air tube and outer covering are separable for the purposes of repair in case of puncture or cut, or other rupture causing leakage of air and yet sufficiently united by vulcanization to prevent friction between them when in use.

It is a further object of our invention to provide a novel method of uniting the ends of the air tube.

To these ends our invention consists in the novel method hereinafter fully described of making pneumatic tires, due reference being had to the accompanying drawings forming a part of this specification, wherein—

Figure 1 is a perspective view of a portion of one of our improved tires, showing a puncture or cut in one side thereof. Fig. 2 is a perspective view to show the slit in the outer tube opened for withdrawing a part of the air tube; Fig. 3 a perspective view illustrating the method of stripping back the outer tube to repair the air tube. Fig. 4 is a section of the outer tube and the punctured inner tube; Fig. 5 a view illustrating the manner of closing up the cut made in the outer tube to repair the air tube; Figs. 6 and 7 views respectively of the rubber and canvas patches employed in repairing the tire; Figs. 8 to 14, inclusive, views illustrating the manner of uniting the ends of the air tube.

In making our improved tire the air tube is preferably made by wrapping a thin sheet of rubber around a mandrel, but it may be made in any well known manner. The tube thus formed is then partially vulcanized. The degree of partial vulcanization can readily be determined by those skilled in vulcanizing rubber tires, the vulcanization being sufficient when the effect of the process has become distinctly visible. Great care is not necessary in the operation as considerable latitude is permissible. The outer covering formed of rubber and fabric as usual, is then put over the air tube in the ordinary manner, and the whole is finally vulcanized. As thus formed there is a less intimate union between, or blending of the air tube and its outer covering than is the case where the two are put together in a raw state and vulcanized, but the air tube and its covering will sufficiently adhere to each other to keep the parts together in use, but can be readily separated in the event of its being necessary to repair the air tube. The same result may also be accomplished by first fully vulcanizing the air tube as usual in vulcanizing pneumatic tires and then desulphurizing the same by boiling in a solution of potash, or other solvent of sulphur, or otherwise removing the free sulphur, or that which has not become absorbed or united with the rubber. The outer covering is then applied to the air tube and vulcanized as before. The result is the same as in the method before described, the air tube and the covering adhering together sufficiently for all practical purposes, but capable of being readily separated for repair. When the air tube is to be prepared by partial vulcanization we prefer to use less sulphur in proportion to the raw rubber than is usual in vulcanizing air-tubes for tires contained in the outer covering.

A tire thus constructed may very readily be repaired in the event of the air tube being cut or punctured in the following manner: Let it be assumed, for example, that the tube has been punctured in one side, as shown in Figs. 1 and 4 of the drawings, wherein A denotes the air tube and B the outer covering. The tire is removed from the rim of the wheel and a longitudinal incision made on the inner side of the tire through the outer covering down to the air tube. A finger is inserted through the slit and the air tube is stripped from the outer tube, as shown in Fig. 3, sufficiently to give access to the puncture. A patch of rubber C (see Fig. 6) of the proper size is then placed over the puncture and cemented to the air tube, rubber cement being preferably used for the purpose. Should the cut in the tire be a large one we also patch and strengthen the outer covering with a patch D, (see Fig. 7) of canvas, or other suitable material cemented to the inner side of the outer casing. The longitudinal incision made in the outer covering is then closed up by stitches, or otherwise, as shown in Fig. 5, the edges being first cemented. The puncture in the outer covering is, in most cases, immaterial and may be treated in any of the ordinary and well known methods. The tube will now prove perfectly air tight, and the tire may be restored to the wheel. The incision made in the outer covering to afford access to the air tube being upon the inner side of the tire is protected and rendered invisible by the concave rim of the wheel.

We prefer to place a narrow strip of fabric E (see Fig. 2) upon the inside circumference of the air tube before the cover is put on, and if desired the same may be cemented to the air tube. This serves as a guide in making the incision in the outer covering to repair the tire, and indicates when the incision has been made deep enough, thus guarding against inadvertently cutting the air tube. We prefer that the strip E should not adhere to the outer covering and therefore treat its outer side with powdered soap stone, or other suitable material. In making the incision in the tire the strip E should not be cut.

In manufacturing our improved tire it is found desirable to apply the preliminary treatment to the air tube before described previous to joining together the ends of the tube, and as the adhesive quality of the rubber has been diminished by the treatment we employ raw rubber to make a strong, air tight joint in joining together the ends, and in Figs. 8 to 14 inclusive, we show several different methods of making the joint. As shown in Fig. 8 an annulus F of raw rubber, the outside diameter of which being substantially equal to the inside diameter of the air tube A, is inserted in each end of the air tube flush with the ends thereof. When the ends of the air tube are brought together the rings F are in intimate contact with each other, and in the final vulcanization of the tire the rings are vulcanized to the air tube and to each other, making a perfectly air tight and strong joint, as shown in Fig. 9.

Instead of the rings F, a sheet of raw rubber G (see Figs. 11 and 12) having a circular aperture equal, or nearly equal, in diameter to the internal diameter of the air tube may be employed. Said sheet G is placed across one end of the air tube and the other end thereof brought against said sheet in such manner that the two ends of the air tube register, and the protruding edges of the sheet are then trimmed away. Or, if desired, both the rings F and the sheet G may be employed, as shown in Fig. 13. When the sheet alone is employed for the purpose a very strong joint may be made, as shown in Fig. 14. The air tube being made of sheet rubber wrapped about a mandrel, as before described, the sheet may be rolled with thickened edges $a$ so that the ends of the tube when brought into juxtaposition present a larger contact surface to the intervening sheet of rubber.

We have described soap-stone, or other suitable material applied to the strip E for preventing its adhesion to the outer covering, but we do not confine ourselves to the particular means described, as employing soap-stone or the like may leave the strip E perfectly dry or uncemented to come against a dry or uncemented part of the strengthening canvas or other material of the outer case.

Having described our invention, what we claim is—

1. The method herein described of making pneumatic tires, which consists in separably vulcanizing together an inner air tube and an outer covering so that while attached one to the other to prevent creeping or shifting the air tube can be separated from the covering at any desired point, substantially as set forth.

2. The herein described method of making pneumatic tires, consisting in partially vulcanizing a rubber air tube, applying the outer covering thereto, and finally vulcanizing the whole, substantially as and for the purpose specified.

3. The herein described method of making pneumatic tires, consisting in vulcanizing a rubber air tube, then desulphurizing the same, applying the outer covering to the air tube, and finally vulcanizing the whole, substantially as and for the purpose specified.

4. The herein described method of making pneumatic tires, consisting in first subjecting a rubber air tube to vulcanization, bringing the ends thereof together in contact with raw rubber, applying a covering to the air tube, and finally vulcanizing the whole, substantially as and for the purpose specified.

5. As a new article of manufacture, a pneumatic tire, consisting of an air tube and an outer covering separably vulcanized together so that while attached one to the other to prevent creeping or shifting the air tube can be separated from the covering at any desired point, substantially as described.

6. A pneumatic tire, consisting of an air tube, and an outer covering separably vulcanized together so that the two are attached to prevent creeping or shifting while the air tube can be separated from the covering at any desired point, and a strip of narrow fabric interposed between the said air tube and the said covering along the inner circumference of the air-tube, substantially as described.

7. A pneumatic tire, consisting of an air-tube, and an outer covering separably vulcanized together so that they are attached one to another to prevent creeping or shifting while the air tube can be separated from the covering at any desired point, and a narrow strip of fabric coated with soap-stone and interposed between the air-tube and the said outer covering along the inner circumference of the air-tube, substantially as described.

In testimony whereof we have hereunto set our hands in presence of two subscribing witnesses.

PARDON W. TILLINGHAST.
FRANK MALLALIEU.

Witnesses:
S. SCHOLFIELD,
HARRY J. GARCEAU.